US012774725B2

(12) United States Patent
Montgomery

(10) Patent No.: US 12,774,725 B2
(45) Date of Patent: Oct. 27, 2026

(54) DISC-BRAKE CALIPER SHIELD SYSTEM

(71) Applicant: John Montgomery, Greer, SC (US)

(72) Inventor: John Montgomery, Greer, SC (US)

( * ) Notice: Subject to any disclaimer, the term of this patent is extended or adjusted under 35 U.S.C. 154(b) by 141 days.

(21) Appl. No.: 18/632,244

(22) Filed: Apr. 10, 2024

(65) Prior Publication Data

US 2025/0320899 A1 Oct. 16, 2025

(51) Int. Cl.
*F16D 65/00* (2006.01)

(52) U.S. Cl.
CPC .. *F16D 65/0081* (2013.01); *F16D 2250/0084* (2013.01)

(58) Field of Classification Search
CPC ......... F16D 65/0081; F16D 2250/0084; F16D 2055/0037
USPC .......................... D12/180; 188/218 R, 218 A
See application file for complete search history.

(56) References Cited

U.S. PATENT DOCUMENTS 1,515,131 A * 11/1924 Ott .......................... B23B 45/06 81/35
5,165,712 A * 11/1992 Fuller .................... B62K 25/08 280/157
5,839,326 A * 11/1998 Song ...................... G05G 1/405 403/107
11,226,018 B2 * 1/2022 Barland .............. F16D 65/0068
2004/0074716 A1 * 4/2004 Brumfield ............... F16D 55/22 188/218 A
2009/0321198 A1 * 12/2009 Barland .............. F16D 65/0031 188/264 A
2018/0010656 A1 * 1/2018 Barland .............. F16D 65/0081
2018/0080512 A1 * 3/2018 Barland .............. F16D 65/0087
2018/0231076 A1 * 8/2018 Choi ................... F16D 65/0006
2019/0338815 A1 * 11/2019 Park .................... F16D 65/0081
2024/0084863 A1 * 3/2024 Crippa ................ F16D 65/0068
2025/0320899 A1 * 10/2025 Montgomery ...... F16D 65/0081

FOREIGN PATENT DOCUMENTS

CN 209458317 U * 10/2019
CN 210799826 U * 6/2020
CN 214274299 U * 9/2021
CN 219795918 U * 10/2023
CN 117685318 A * 3/2024 ........... F16D 65/097
EP 4112964 A1 * 1/2023 ............. F16D 65/02

* cited by examiner

*Primary Examiner* — Thomas J Williams
(74) *Attorney, Agent, or Firm* — Robert Brownstein

(57) ABSTRACT

The invention herein disclosed is a disc-brake caliper shield system that is adjustable so as to fit a variety of disc-brake calipers having different shapes, sizes and hex bolt positions.

3 Claims, 5 Drawing Sheets

DISC-BRAKE CALIPER SHIELD SYSTEM

TECHNICAL FIELD

The invention is a system that covers a vehicle's disc-brake caliper providing cosmetic and protective features.

BACKGROUND OF INVENTION

Although invented in 1902, disc brakes were first introduced to US vehicles in 1949 and essentially displaced drum brakes in the late 1970s and early 1980s.

Instead of the drum brake oriented pan-shaped wheel, the disc brake had a metallic rotor and caliper which was readily seen behind each wheel.

Disc-brake calipers had a fairly standard design by the 1970s but came in a variety of sizes.

As added protection and ornamentation, disc-brake caliper shields were invented, and like the calipers, they came in a variety of sizes with attachments customized for various makes and models of cars.

Makers and sellers of disc-brake caliper shields require that a purchaser specify year, make and model. Most car-parts retailers avoid stocking such items because of the sheer number of different models.

BRIEF DESCRIPTION OF INVENTION

The invention herein disclosed and claimed is a disc-brake caliper shield system that can be adjusted to fit virtually any caliper on any make and model of vehicle. By equipping the shield with two adjustable flanges, and providing shield-attaching fixtures that can be extended horizontally and vertically, a shield can be adjusted to securely attach to a wide variety of disc-brake calipers.

DETAILED DESCRIPTION OF INVENTION

With drum brakes largely replaced by disc brakes in the late 1970s and early 1980s, solid wheels gave way to hub-and-spoke type wheels that showed the rotor and disc-brake calipers behind them.

The calipers were typically unpainted metallic structures that could be dressed up with straddling shields that were more attractive looking and provided some protection for the underlying caliper.

However, there was no standard for caliper size and enclosure, and there were myriad caliper models associated with individual vehicle makes and models.

Makers and sellers of disc-brake shield systems required purchasers to specify year, make and model in order to purchase an essentially customized disc-brake shield.

Although nearly all calipers have two hex bolts that hold their enclosures firmly together, the location of those hex bolts is not standardized and varies with the various disc-brake calipers. Thus, when a disc-brake shield maker outfits a shield with attachment fixtures, those fixtures are specific to each model of caliper in order to make use of those hex bolts for attachment purposes.

The invention herein disclosed is operative to enable a shield to be adjusted and attached to essentially any caliper. It does so by outfitting the shield, itself, with flanges that allow it to be positioned in a plane of the disc-brake rotor. Attached to these flanges are identical, adjustable, shield attachment fixtures that can be extended horizontally and vertically so as to position a hex-bolt collar exactly where a hex bolt is located. Thus, the shield with its adjustable attachment fixtures can be adjusted to fit a wide variety of calipers having different hex-bolt positions.

Most car-parts retailers do not stock disc-brake shield systems because there are simply too many different, customized units. However, a disc-brake system based on the invention herein disclosed would make it possible to stock only a few different unit models that would cover virtually every disc-brake caliper.

The following descriptions and related drawings are exemplary and should not be read as limiting the scope of claims.

Figure 1:
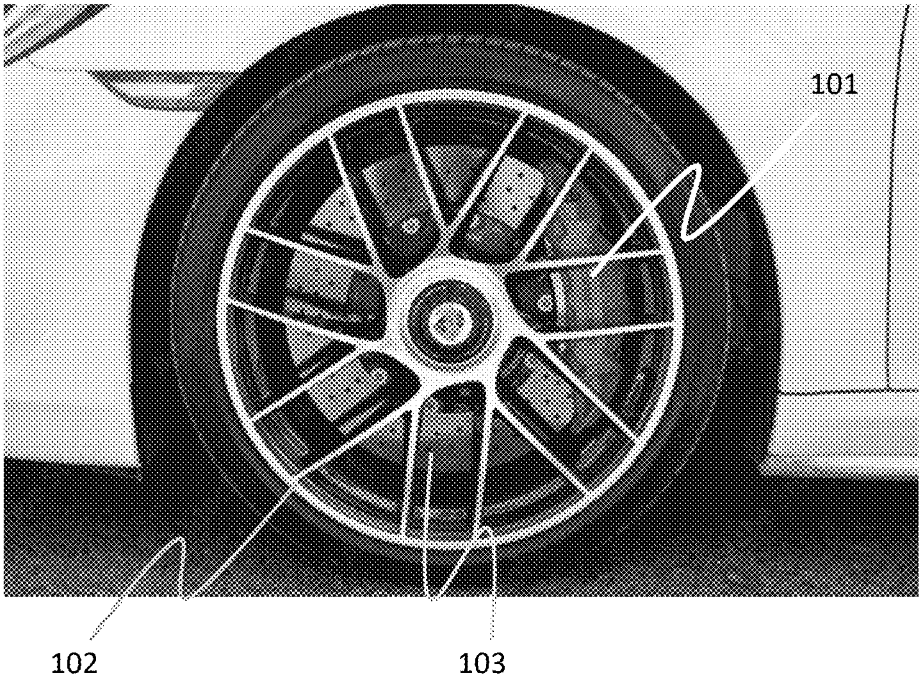
FIG. 1 shows a wheel with the rotor and caliper appearing behind it.

In FIG. 1, a hub-and-spoke type wheel (102) enables one to see the disc-brake rotor (103) and disc-brake caliper (101) behind the wheel. In this figure the disc-brake caliper is covered by a shield which gives it a color that is different from the raw metal finish.

Figure 2:
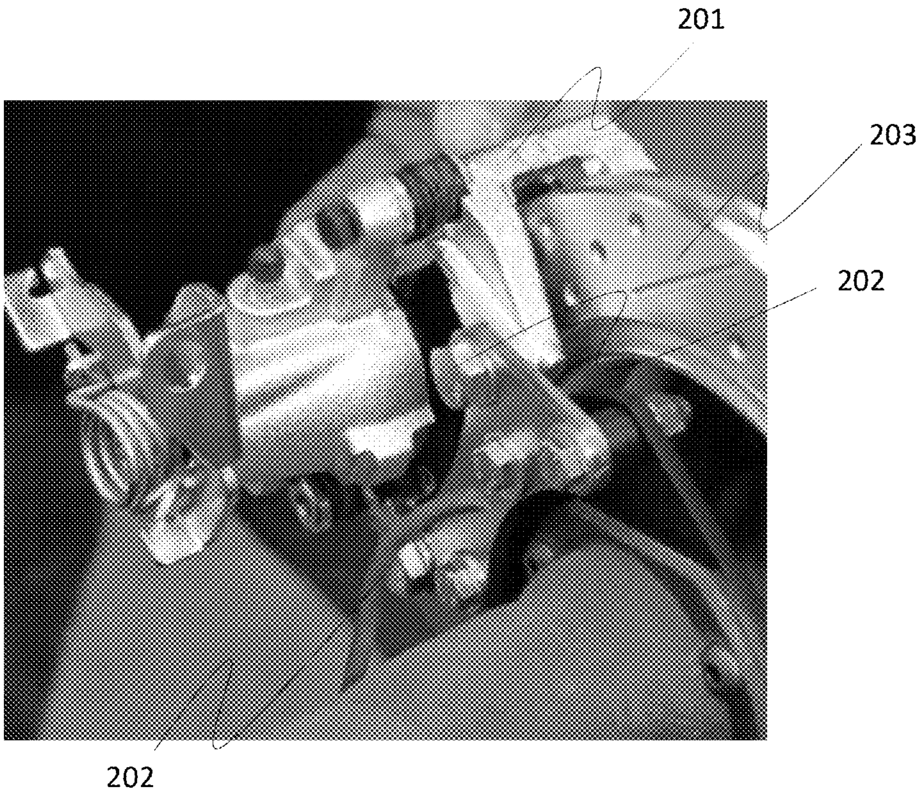
FIG. 2 shows a disc-brake caliper and typical hex bolts on the portion facing away from the wheel.

In FIG. 2, the view is from the behind the wheel showing a caliper (201), a rotor (203) and a pair of hex bolts (202) that hold the caliper enclosure firmly together.

Figure 3:
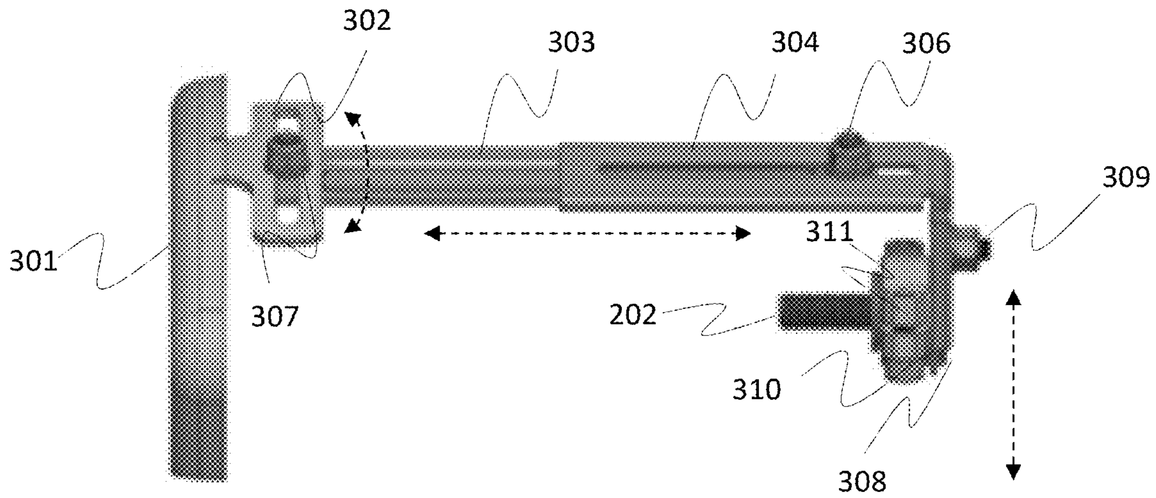
FIG. 3 illustrates an embodiment of the invention with a shield and one of two adjustable attachment fixtures in view

FIG. 3 is a side view from a slightly elevated position showing the shield (301) and one of its two flanges (302) where the flange allows the shield to be positioned in the plane of the rotor, and once positioned, it is held in place by tightening a screw (307). The shield adjustable attachment fixture has an interleaved portion (303) that slips inside another portion (304) which comprises a vertical portion (308). The horizontal extension can be adjusted by moving 304 relative to 303 and then tightening it using screw (306); and the vertical extension is done by moving the hex-bolt attachment collar (310) up or down relative to 308 and then tightening it into position with screw 309. The hex-bolt attachment collar (310) is tightened onto the hex-bolt head using sub-fixture 311. The dotted-line arrows show the adjustment directions of the attachment fixtures and shield flanges. The hex bolt (FIG. 2, 202) is shown for clarity but is not part of the adjustable attachment fixtures.

Figure 4:
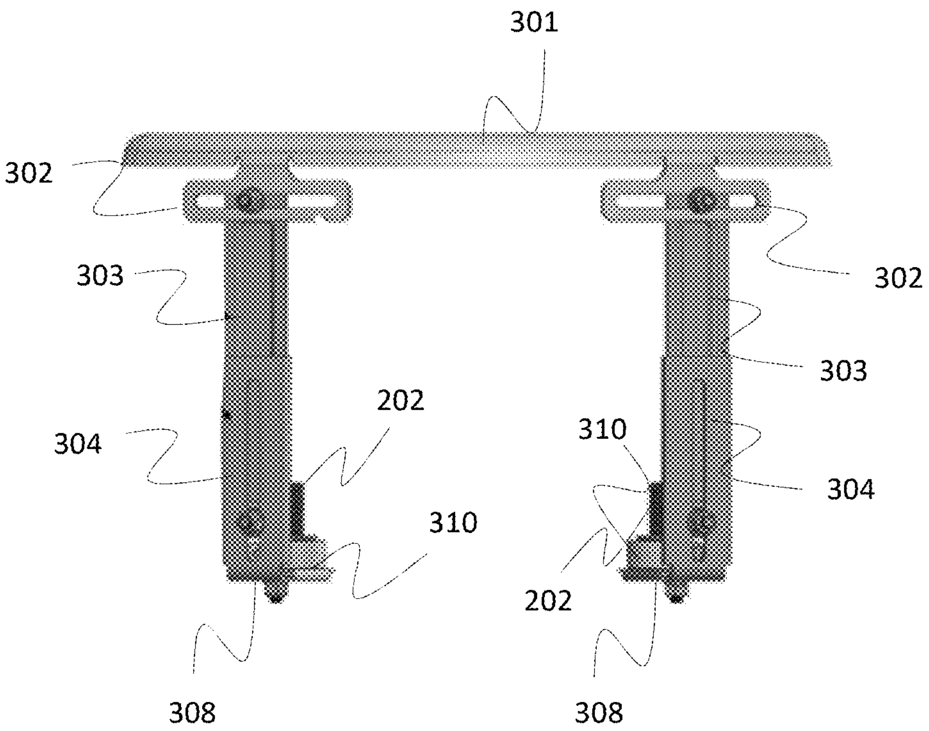
FIG. 4 is a top-down view showing a shield and both adjustable attachment fixtures.

FIG. 4 shows the full complement of shield and attachment fixtures from a top-down view.

Figure 5:
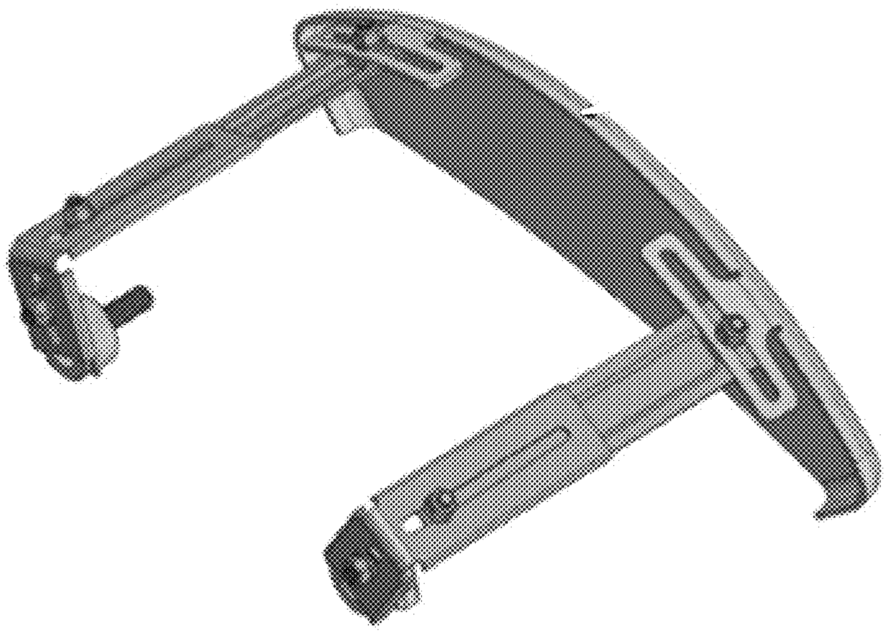
FIG. 5 is a perspective view of the shield with both adjustable attachment fixtures in place.

FIG. 5 shows a perspective view of the shield and adjustable attachment fixtures.

An exemplary method for attaching the disc-brake shield system to a caliper is to first attach the two adjustable shield attachment fixtures to their respective shield flanges. Then, loosening the screws 306, 307, and 309, place the shield so that it straddles the caliper and adjust the adjustable attachment fixtures such that the hex bolt collars cover the hex bolt heads, and tighten the collars using sub-fixture 311. Then, position the shield so that it is covering the caliper and tighten screws 306, 307 and 309.

All drawings and descriptions are meant to be exemplary and should not be read as limiting the scope of the invention. The range of extension, horizontally and vertically, is determined by the sizes and slot lengths in the 303, 304 and 308 portions of the adjustable shield attachment fixtures. A maximum and minimum length could be determined which would be implemented by those sizes and slot lengths.

What is claimed is:

1. A disc-brake caliper shield system comprising:

a caliper shield having a pair of shield flanges, and adjustable shield-attachment fixtures respectively attached to the pair of shield flanges, each adjustable shield-attachment fixture comprising (i) an interleaved horizontal adjustment portion configured to provide adjustable horizontal extension, (ii) a vertical adjustment portion configured to provide adjustable vertical extension, and (iii) a hex-bolt attachment collar configured to engage a hex-bolt head of a disc-brake caliper, wherein the horizontal adjustment portion and the vertical adjustment portion are jointly adjustable to position the hex-bolt attachment collar at a location of the hex-bolt head on the disc-brake caliper.

2. A disc-brake caliper shield system according to claim 1 wherein the caliper shield comprises a pair the pair of shield flanges operative to allow adjustable shield positioning in a plane of a disc-brake rotor, and wherein the adjustable shield-attachment fixtures are attached to the pair of flanges.

3. A method of attaching a disc-brake caliper shield system comprising:

attaching each of two adjustable shield-attachment fixtures to a respective one of each of two caliper shield flanges using a flange-attachment mounting fixture for each adjustable shield-attachment fixture;

adjusting a pair of interleaved horizontal adjustment portions of the two adjustable shield-attachment fixtures for maximum extension;

adjusting a pair of vertical adjustment portions of the two adjustable shield-attachment fixtures for maximum vertical length;

placing the disc-brake caliper shield over the disc-brake caliper;

adjusting horizontal and vertical lengths on each of the two adjustable shield-attachment fixtures such that a respective hex-bolt attachment collar slips over a respective hex-bolt head;

tightening the hex-bolt collars on the hex-bolt heads;

tightening a pair of vertical length adjustment screws;

moving the caliper shield such that it straddles the disc-brake caliper; and tightening a pair of horizontal length adjustment screws;

moving the caliper shield in the a plane of a disc-brake rotor until it is in a desired position; and tightening a pair of flange-attachment screws.

* * * * *